United States Patent [19]

Young

[11] 4,143,610

[45] Mar. 13, 1979

[54] CONTAINER PROCESSING APPARATUS

[75] Inventor: Jerry W. Young, Weston, Mo.

[73] Assignee: Phillips Petroleum Company, Bartlesville, Okla.

[21] Appl. No.: 798,049

[22] Filed: May 18, 1977

[51] Int. Cl.$^2$ ............................................. B21D 43/00
[52] U.S. Cl. ............................... 113/113 D; 113/7 R; 113/115; 221/223
[58] Field of Search ............ 113/27, 7 R, 7 A, 113 D, 113/115, 114 B, 114 C; 221/222, 223, 278, 297

[56] References Cited

U.S. PATENT DOCUMENTS

| | | | |
|---|---|---|---|
| 2,013,654 | 9/1935 | Holthersall | 113/16 |
| 3,591,047 | 7/1971 | Buhle | 221/151 |
| 3,687,098 | 8/1972 | Magtag | 113/16 X |
| 3,795,346 | 3/1974 | Roberts | 221/223 |
| 3,811,306 | 5/1974 | Yoshimura | 113/16 X |
| 3,872,786 | 3/1975 | Holton | 72/427 |

*Primary Examiner*—Leon Gilden

[57] ABSTRACT

An apparatus is provided for performing certain manufacturing operations on a container such as forming a beaded rim around the upper open end of the container. The apparatus includes means for dispensing rimless containers into container-receiving receptacles which are mounted on a rotatable turret which moves the containers from one station to another station of the apparatus. Gripping means is provided to retain the containers within the receptacles and bead-forming means is also provided and is operable to form a bead on the upper disposed edge of the container. Ejection means is also provided for ejecting a finished container from a receptacle.

12 Claims, 14 Drawing Figures

CONTAINER PROCESSING APPARATUS

The present invention relates to an apparatus for performing certain operations on a container such as forming a beaded rim on the open end thereof. Many apparatuses are known in the art for accomplishing this but same have been plagued with certain difficulties. The major difficulty is in the feeding of larger thin-wall rimless containers to the conveying means of the apparatus. This is primarily due to the flexibility of the side wall of the container wherein same is very flexible, making the container difficult to handle. Also, a thin-wall container presents a thin upper edge which provides difficulty in engagement of same with a feeder mechanism to urge movement of a container by the feeder which would normally engage the upper edge whereby feeding reliability of same is reduced. Another problem which occurred in other apparatuses is that the top bead which is formed was irregular, wrinkled, or had other faults which detracted from the overall quality of the bead and container. In the present invention this is overcome by providing an improved bead-forming means in which the upper edge is contained within a groove defined by a portion of the forming head and a ring movably mounted on the upper end of the receptacles.

The principal objects and advantages of the present invention are: to provide an apparatus to efficiently perform certain manufacturing operations on unfinished containers; to provide such an apparatus with feed means which is effective to feed flexible, rimless, thin-wall containers to a conveyor portion of the apparatus; to provide such an apparatus which is effective to retain the containers and receptacles on the conveyor, preventing movement thereof during manufacturing operations performed on the containers; to provide such an apparatus with improved bead-forming means for forming more consistent and better quality beads on the upper free edge of the containers; to provide such an apparatus wherein the feed means is effective to feed containers to the conveyor with a minimum of missed feeds; and to provide such an apparatus which is well adapted for its intended use, economical to manufacture, easy to maintain and positive in operation.

Other objects and advantages of the present invention will become apparent from the following description taken in connection with the accompanying drawings wherein are set forth by way of illustration and example, certain embodiments of the present invention.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

Figure 1:
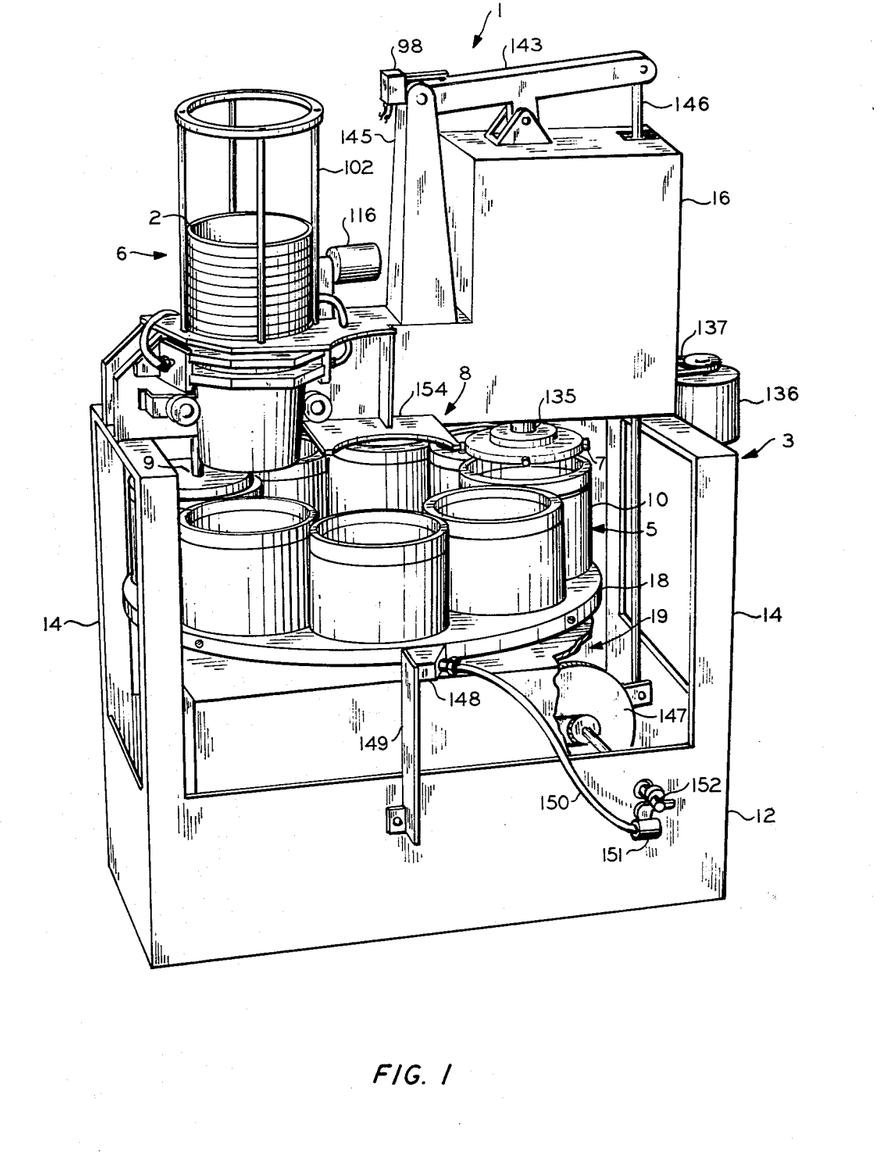
FIG. 1 is a perspective view of an apparatus for performing certain manufacturing operations for forming containers.

The reference numeral 1 designates generally an apparatus for performing certain manufacturing operations on a container 2 which is preferably of a rimless frusto-conical type of construction. The apparatus 1 includes a support or frame means 3 which suitably carries and supports various portions of the apparatus 1. The apparatus 1 further includes conveying means 5 which is adapted to move containers from dispensing means 6 to a bead-forming means 7 and thereafter to an ejecting means 8 from which containers are ejected from the conveying means 5. The apparatus 1 also includes seating means 9 which is adapted to assure seating of containers within container receiving receptacles 10 which are carried by the conveying means 5.

In the illustrated structure the support means include a base 12 having upright support members 14 extending therefrom and having cross braces 15 extending between and secured to certain of the uprights. As shown, various portions of the apparatus 1 are supported by the uprights 14 and braces 15 which as illustrated includes the dispensing means 6, portions of the bead-forming means 7 and the seating means 9. Preferably, a housing 16 is provided to enclose various rotating portions of the bead-forming means 7.

The conveying means 5 is operable for transferring containers dispensed from the dispensing means 6 to other areas of the apparatus 1 including the seating means 9, the bead-forming means 7 and the ejection means 8. In the illustrated structure the conveying means 5 includes a rotatable turret 18 which is suitably mounted on and driven by drive means 19, preferably in a sequential manner, whereby the drive means would typically include an electric motor and an indexing drive such as a Geneva drive arrangement which is well known in the art. The turret 18 as shown is positioned in a horizontal plane and rotates about a vertical axis. A plurality of receptacles 10 are mounted on the turret 18 and are positioned radially about the center of the turret 18, with the longitudinal axis of the receptacles being generally vertical, i.e., generally parallel to the axis of rotation of the turret 18. The receptacles 10 have an open end which opens generally upwardly for a purpose to be later described.

Figure 6:
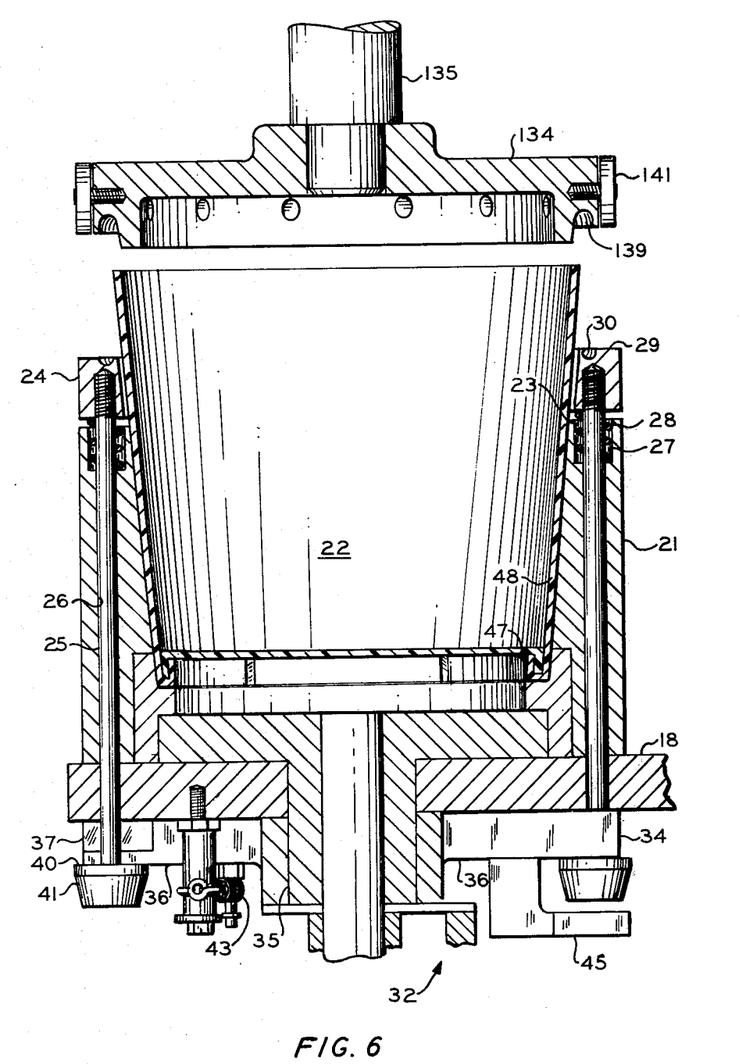
FIG. 6 is a sectional view of a container-receiving receptacle showing a bead-forming ring in a retracted and latched position.
Figure 7:
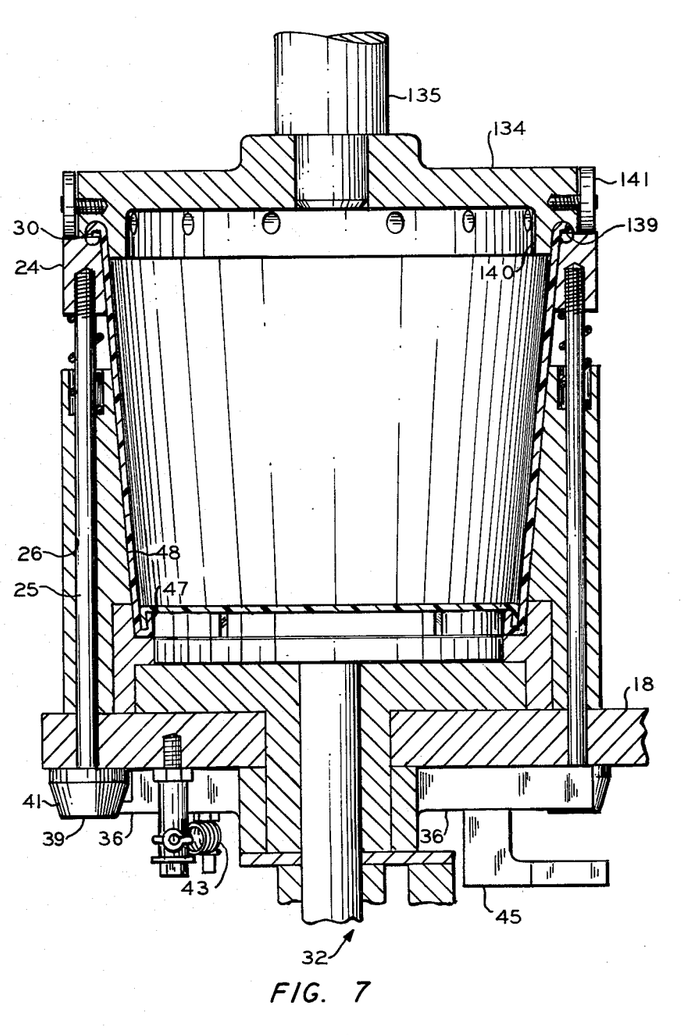
FIG. 7 is a sectional view of the container-receiving receptacle showing the bead-forming ring and rolling head in an extended position with the bead partially formed.
Figure 8:
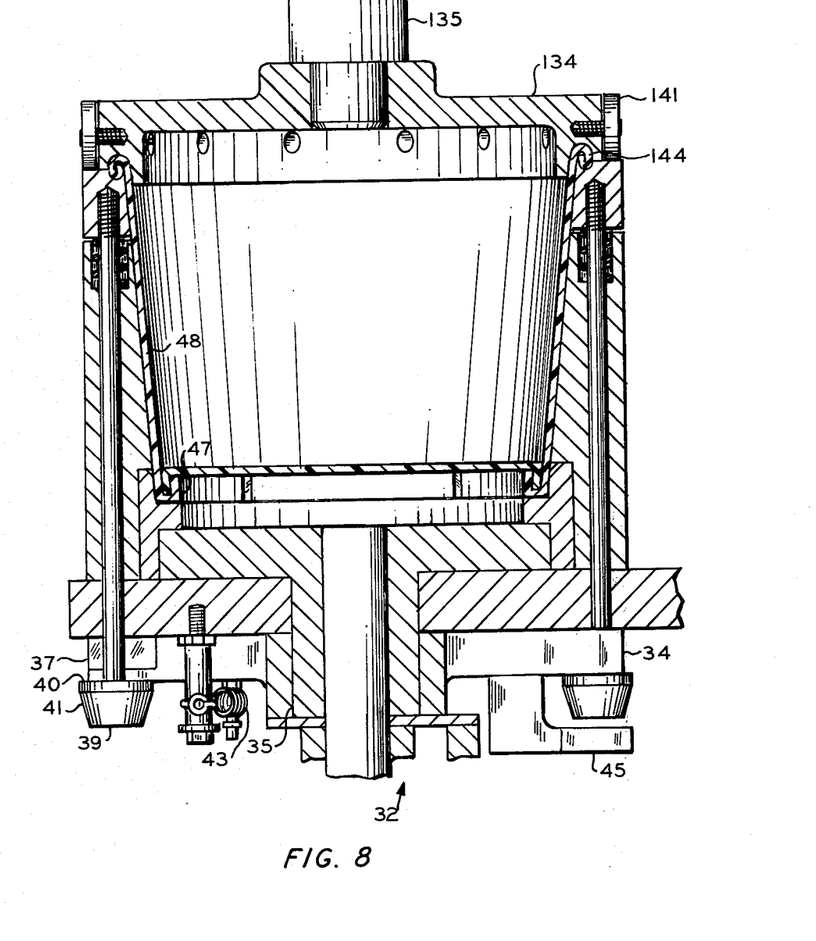
FIG. 8 is a sectional view similar to FIG. 7 but showing the rolling head extended and the forming ring retracted with the bead completely formed thereby.
Figure 9:
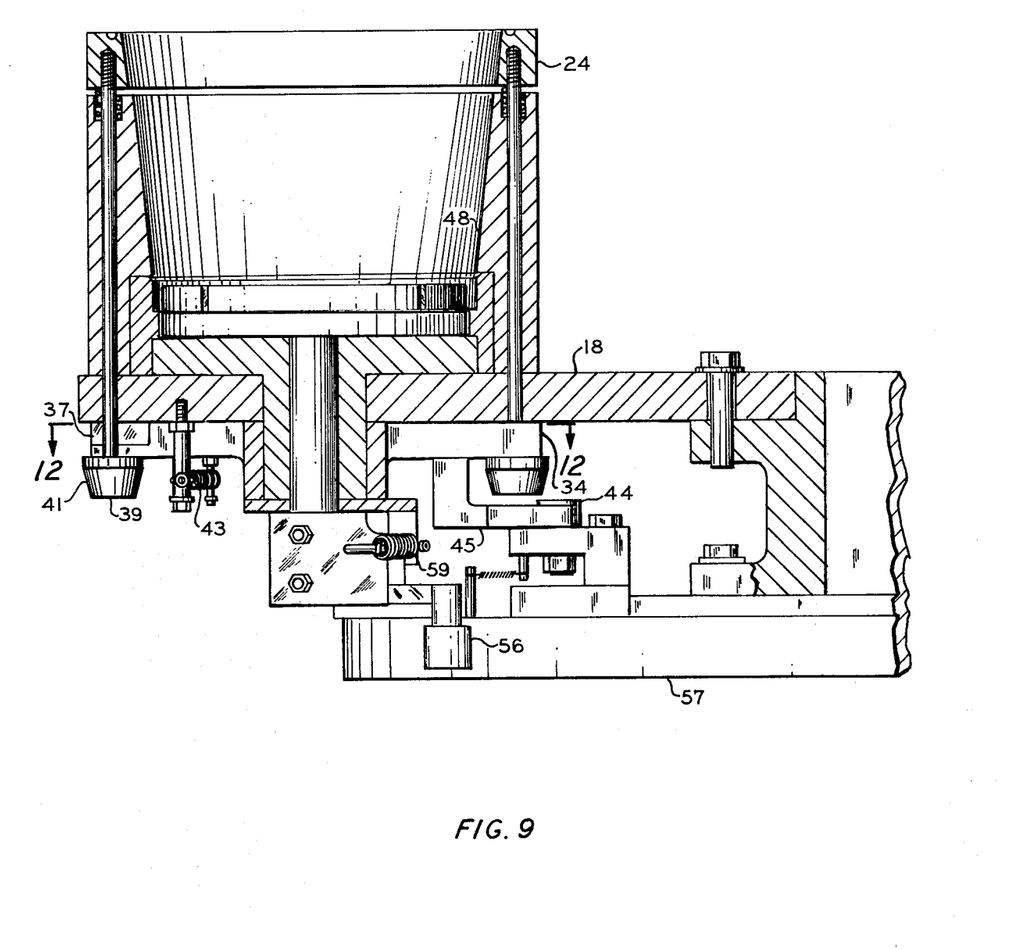
FIG. 9 is a sectional elevational view of the latch means and receptacle and the means for actuating the latch means.
Figures 10, 11:
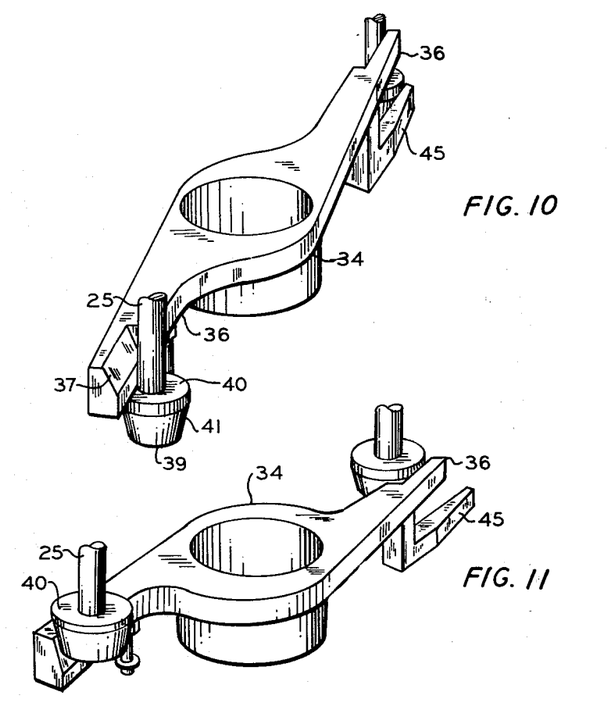
FIG. 10 is a fragmentary sectional view of latching means used to retain the forming ring in the reduced position. The latch means are shown in a latched position.
FIG. 11 is a figure similar to FIG. 10 but showing the latching means in an unlatched position.

The receptacles 10 are suitably secured to the turret 18 and are adapted to receive and retain therein a counter 2 and while retained therein the container 2 has certain manufacturing operations performed thereon. FIGS. 6 through 8, inclusive, show a preferred form of receptacle, although it is to be understood that other forms of receptacles could be used. As shown, the receptacles 10 are each comprised of a body member 21 which has a hollow interior 22 sized and shaped to receive therein a container 2. The body 21 is secured to the turret 18 in any suitable manner. The body 21 has an upper open end 23 and has mounted thereon in a preferred embodiment, a ring 24 which is movable such as by having guide rods 25 each sleeved in a through bore 26 which thereby permits axial movement of the ring 24 between an extended and a retracted position in engagement with the upper edge of the body 21. Preferably, the ring 24 is biased to the extended position as, for example, by having same spring-loaded. In the illustrated structure, the bores 26 are counter-sunk at 27 to provide space for a spring to be received around the guide rods 25 whereby compression in the springs 28 urge the ring 24 to move to an extended position as more fully described hereinbelow. The ring 24 has an upwardly facing surface 29 which has a circumferential groove 30 recessed therein for a purpose described below.

Means 32 is provided for selectively retaining and releasing the ring 24 from its retracted position so that same can move to its extended position. The means 32 preferably is a cam-actuated latch means which includes a latching member 34 which is pivotally mounted on a shaft 35 for pivotal or rotational movement thereon. In the illustrated form, the latch member 34 has a pair of arms 36 and adjacent each end of the arms 36 there is provided a tapered surface 37 and each of the guide rods 25 has a shoulder-forming member 39 on the end thereof and are positioned on the same side of the turret 18 as the arms 36. Each of the members 39 has a shoulder 40 engagable with a surface of the respective arm 36 to retain the ring 24 in its retracted position as best seen in FIG. 6. Each of the members 39 is also provided with a tapered surface which is illustrated as a frusto-conical surface 41 which cooperates with the tapered surface 37 to facilitate movement of the latch member 34 rotationally when the ring 24 is moved from its extended position as biased by the springs 28 to its retracted position whereby the tapered surfaces 37 and 41 by engagement therebetween effect rotational movement of the latch member 34. The latch members 34 are each biased as, for example, by a spring tension via a spring 43, to effect rotational movement of the latch members 34 to their latching position. Movement from the extended position to the retracted position is effected by engagement of the ring 24 with portions of the bead-forming means 7 as more fully described below. The extended position of the ring 24 and the unlatched position of the latch means 32 is best seen in FIG. 7. To effect unlatching of the latch means 32 unlatching means is provided. In the illustrated structure the unlatching means includes a shoulder-forming member 44 which in the illustrated structure is secured to a portion of the drive means 19 housing whereby during rotation of the turret 18, the latch member 34 is moved to an unlatched position by the shoulder member 44. The latch members 34 each have an arm 45 secured thereto and is positioned so as to move into engagement with the shoulder member 44 and during movement thereby engages same effecting rotational movement of the latch member 34 to move same out of engagement with the shoulders 40 thereby allowing the ring 24 to move to its extended position at the proper time.

Figure 12:
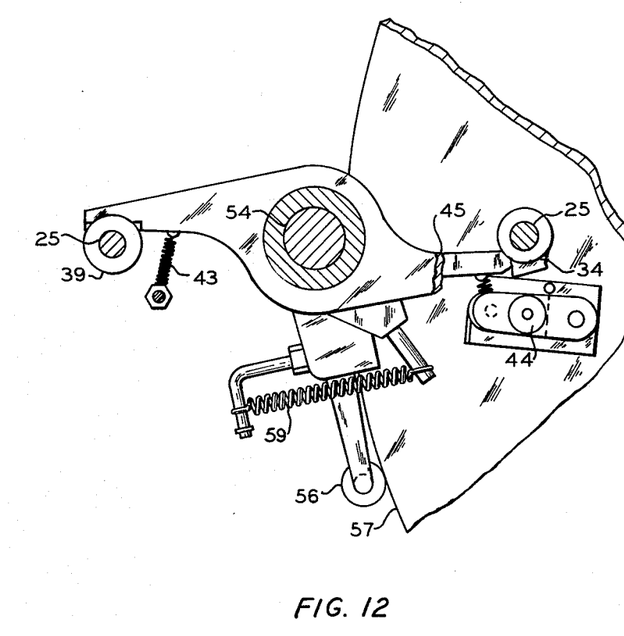
FIG. 12 is a fragmentary view along lines 12—12 of FIG. 9 showing the means for actuating the container gripping means in the receptacle.
Figure 13:
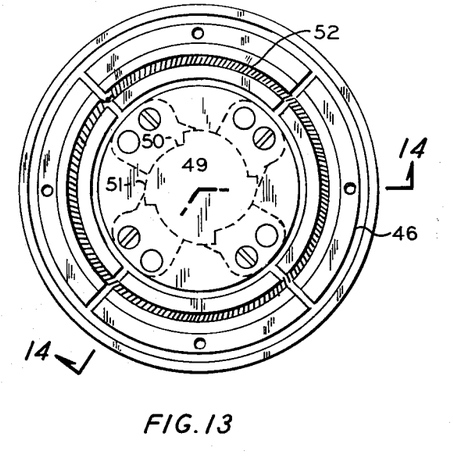
FIG. 13 is a plan view of the container gripping means which are positioned in the bottom of a receptacle (not shown in the figure).
Figure 14:
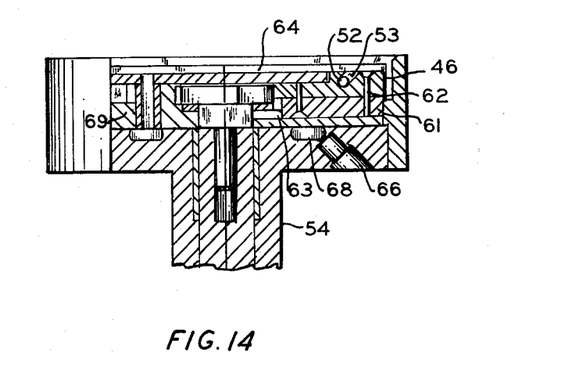
FIG. 14 is a sectional view of gripping means taken along the line 14—14, FIG. 13.

In the structure shown, each of the receptacles 10 is provided with means for gripping and retaining the containers within the respective receptacle 10. At the bottom of each of the receptacles 10, there is provided a plurality of jaw members 46 which are moveable radially outwardly to engage the interior surface 47 of the bottom of the container and clamp same between the jaw 46 and the interior surface 48 of the receptacle 10. A plurality of jaws are provided, as for example, four in the illustrated structure, and means is provided to effect the inward and outward radial movement of the jaws 46. As shown, a cam member 49 is disposed adjacent to the jaws 46 and has a plurality of cam surfaces 50 which are engageable with following surfaces 51 of each of the jaws 46 whereby rotation of the cam 49 effects the movement of the jaws. Preferably, the jaws are biased to a retracted position and one way to effect this is to have a spring 52 received within a groove 53 in each of the jaw members 46 thereby biasing same to the restricted position. The cam 49 is suitably secured to a shaft 54 whereby rotation of the shaft 54 also effects rotation of the cam 49. A cam follower arm 55 is secured to the shaft 54 and has a roller 56 secured thereto. A cam 57 is secured in a position adjacent the turret 18 as, for example, by means secured to the housing of the drive means 19 and engages the followers 56. To maintain engagement between the followers 56 and the cam 57, the arm 55 can be biased as, for example, by a spring 59 to effect the engagement therebetween. Rotation of the turret 18 effects movement of the arm 55 relative to the cam 57 whereby at a predetermined position the cam is contoured so as to effect pivotal movement of the arm 55 and, hence, rotation of the cam 49 and thereby movement of the jaws 46.

The jaws 46 are moveable radially inwardly and outwardly as described above. During movement the jaws 46 are guided by suitable means and, as shown, the means includes T-shaped guides 61 which are each secured to a respective jaw 46 as, for example, by screws 62. The guides 61 are slidably received within a respective T-slot 63 to effect guiding of movement of the jaws. A cover plate 64 is also provided to provide protection for the cam 49 and to prevent upwards movement of various component parts of the gripping means. An air passage 66 is provided and communicates between a passage 67 in the turret 18 whereby pressurized fluid such as air can be injected through the passage 66 into a circumferential groove 68 and therefrom through passage means 69 and out into the interior 22 of the receptacles 10 for selective ejection of a container therefrom as more fully described hereinbelow.

Referring to FIGS. 1–5, the dispensing means 6 is operable to sequentially dispense individual containers 2 into respective receptacles 10. A plurality of similar pairs of jaws 71 and 71' is provided and, as shown, two pairs of jaws is provided which are adapted to receive therein containers 2 for the dispensing of same into the receptacles 10. Each pair of jaws is comprised of two jaw members 72 and 73, and 72' and 73' which are similar in construction and shape. Opening 74 and 75 are defined by the jaws wherein the lower disposed opening 75 is smaller in diameter than the opening 74 of the upper disposed pair of jaws because the containers 2 are of a frustoconical wall design. Preferably, the surfaces defining the opening 74 and 75 are tapered to conform substantially to the taper of the side wall of the containers 2. The upper disposed pair of jaws 71 is movable independently of the lower disposed pair of jaws 71' and the jaw members 72 and 73 and 72' and 73' of each pair are independently movable of one another to effect the dispensing of the containers 2 from the dispensing means. The jaws 71 and 71' are movably mounted on a support 77, such as a plate, which is a portion of the housing 16. The jaws 71 and 71' are slidably supported on the support 77 as, for example, by brackets 78 which have guide grooves 79 which slidably receive edge portions of the jaws 72 and 73 and 72' and 73' therein. Means is provided to effect the movement of the jaws 73 and 72 and 72' and 73' and any suitable means can be used but in the illustrated structure a cam arrangement is provided. In the illustrated structure, each jaw 72 and 73 and 72' and 73' of a respective pair is mounted on two guide rods 81 which are positioned on opposite sides thereof and adjacent to the brackets 78. The jaw 73 is slidable on the rods 81 while the jaw 72 can be secured to an end of the rods 81. The rods 81 and 81' extend through the plate 77 and have the free ends thereof secured to a respective plate member 82 and 82'. Preferably, the jaws 72 and 73 and 72' and 73' are biased to a closed position and, as such, a spring 83 and 83', respectively, in the illustrated structure, is provided and is received on respective rods 81 or 81' and is positioned between a portion of the jaw 73 or 73', respectively, and the plates 82 and 82', respectively and is compressed so as to provide the biasing force to move the jaws 72 and 73 and 72' and 73' to a closed position. Each of the jaws 73 and 73' has a portion 84 and 84', respectively, extending through the plate 77 and in the illustrated structure the portions 84 and 84', each have a through opening 85 and 85', respectively. Also, each of the portions 84 and 84' has an upstanding rib 86 and 86', respectively, thereon with each of the ribs 86 and 86' having a surface 87 and 87', respectively, which defines one side of the respective opening 85 and 85' and is also spaced from the respective plate 82 or 82'.

Figure 3:
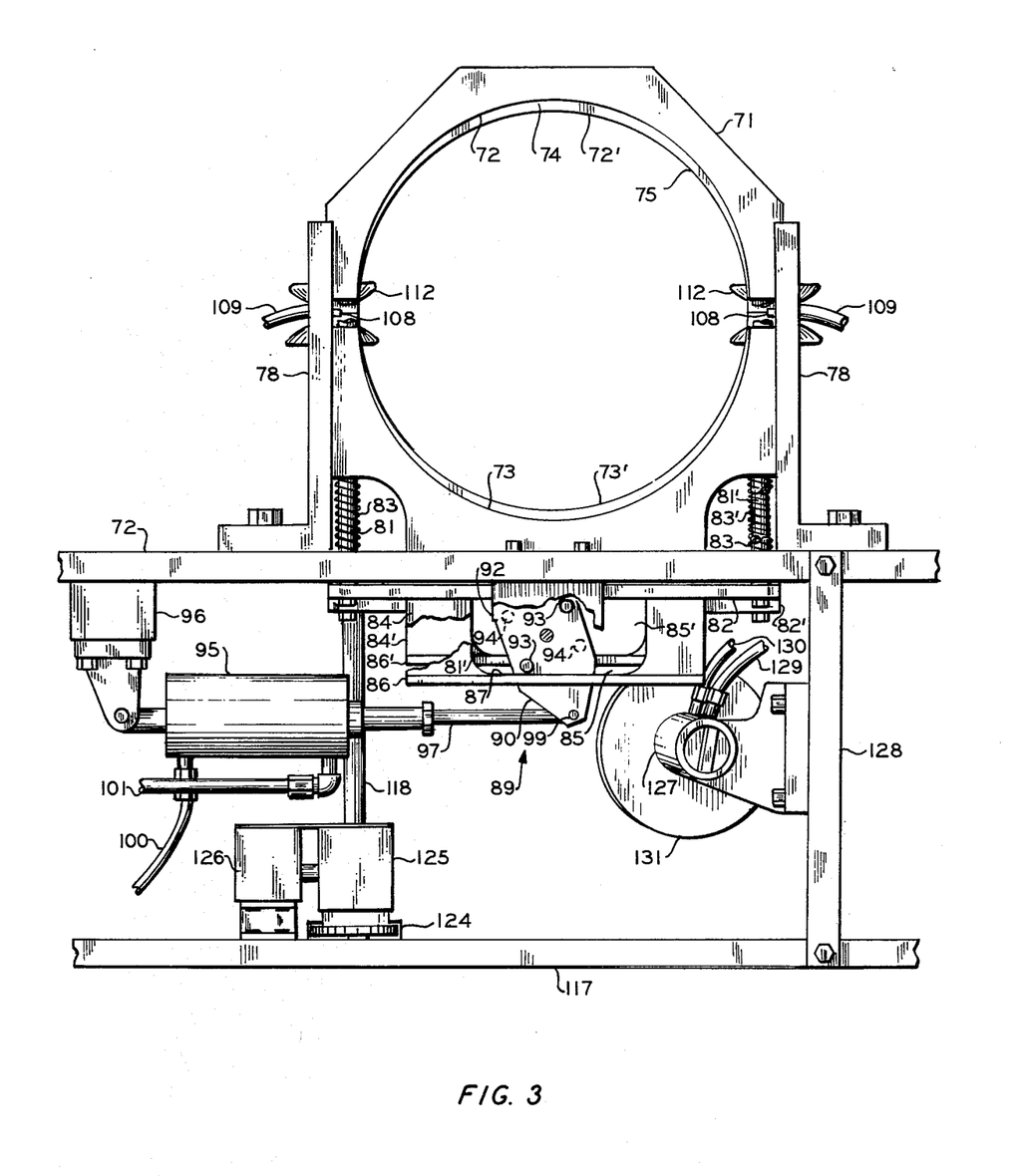
FIG. 3 is a fragmentary plan view of the feed means shown in FIG. 2 with portions thereof removed to show further structural detail of the feed means. The top pair of jaws is shown in an open position.
Figure 4:
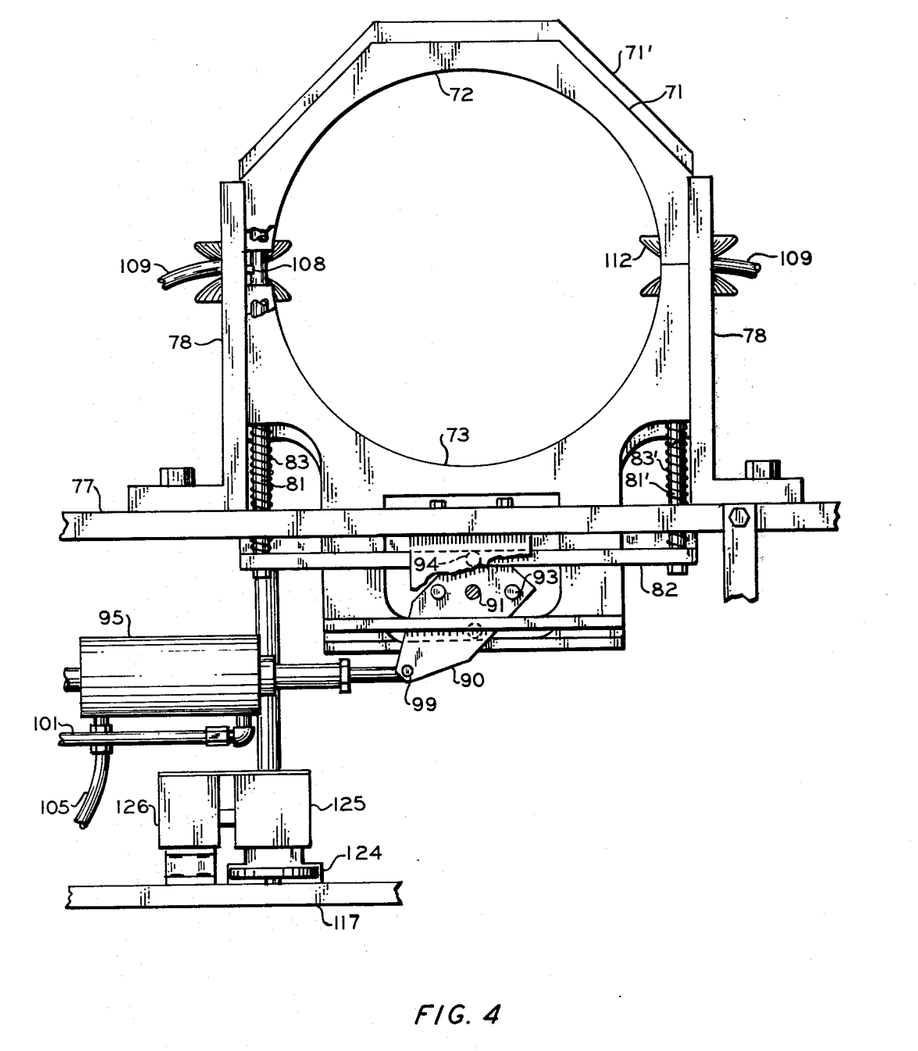
FIG. 4 is a fragmentary plan view similar to FIG. 3 showing the top pair of jaws in a closed position and the bottom pair of jaws on an open position.

In the structure shown, the movement of the jaws 71 and 71' is effected by a cam arrangement denoted generally by the reference numeral 89 which in the illustrated structure is comprised of a plate 90 which is pivotally carried, as for example, by the plate 77 by having a shaft 91 which is rotatably carried by bearing blocks 92 which are secured to the plate 77. A pair of pins 93 extends from one side of the plate 90 and a pair of pins 94 extends from the opposite side of the plate 90. Means is provided to effect pivoting of the plate 90 and in the illustrated structure, an extendable and retractable ram 95 is carried by the plate 77 as, for example, by a mounting arrangement 96 and the moveable rod member 97 is connected to the plate 90 as at 99 whereby extension and retraction of the ram effects reciprocating pivotal movement of the plate 90. Pivoting movement of the plate 90, as best seen in FIG. 3 by extension of the ram, effects movement of the pins 93 into engagement with the respective plate 82 and surface 87 to urge same to move apart relative to one another thereby moving the upper disposed pair of jaws 72 and 73 to an open position as seen in FIG. 3. Retraction of the ram as best seen in FIG. 4, effects movement of the plate 90 in an opposite direction whereby the pins 93 move out of engagement with the respective plate 82 and surface 87 allowing the upper disposed pair of jaws to move to a closed position and the pins 94 move into engagement with the respective plate 82' and surface 87' urging the lower disposed jaws 72' and 73' to move to an open position. Extension of the ram moves the pins 94 out of engagement with the respective surface 87' and plate 82' allowing the lower disposed jaws 72' and 73' to move to their closed position as best seen in FIG. 3 and the upper jaws to move to their open position as described above. The ram 95 is connected to a source of pressurized fluid such as air as via the conduits 100 and 101 wherein the sequence of supplying and exhausting the pressurized fluid is controlled by solenoid valve (not shown) which in turn is actuated by a micro switch 98 operably associated with the drive means 19.

Figure 2:
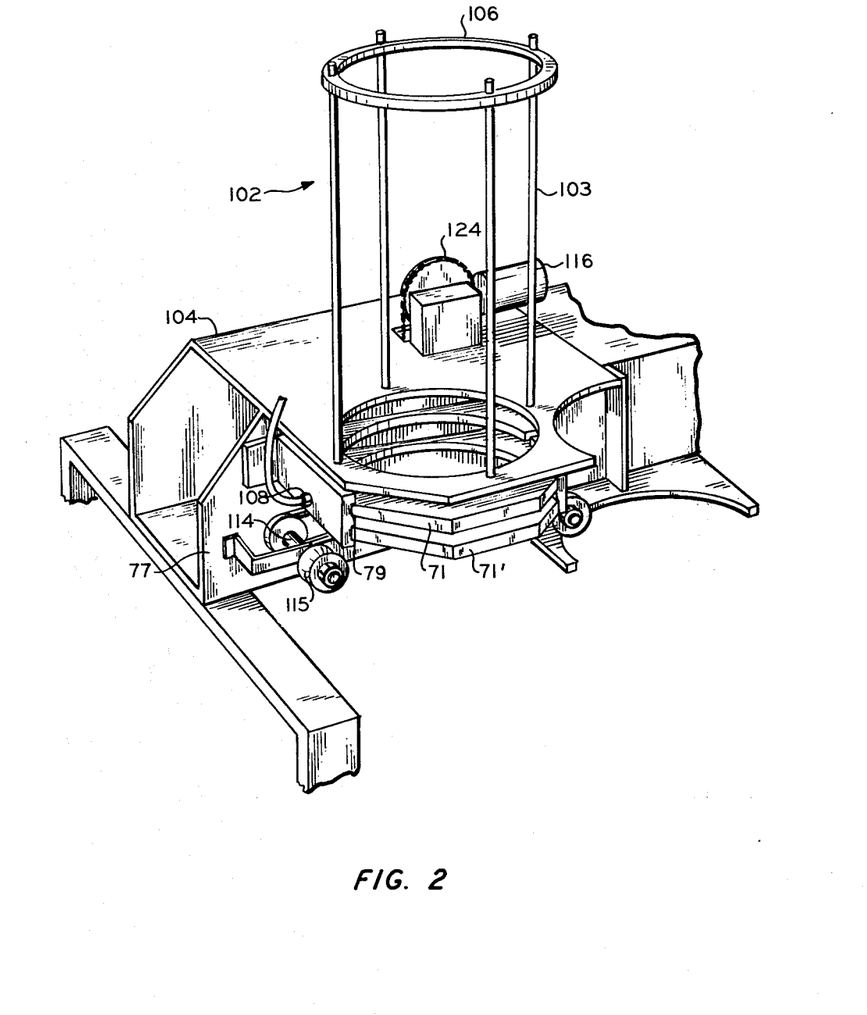
FIG. 2 is a fragmentary perspective view of feed means which feed containers to other portions of the apparatus shown in FIG. 1.

Storage means is provided so as to contain a plurality of containers 2, as for example, a magazine 102 which is comprised of, in the illustrated structure, a plurality of upstanding members 103 which are secured to a plate 104 which in turn is secured to portions of the housing 16. The plate 104 has a through opening 105 which is in substantial axial alignment with the openings 74 and 75. Secured to the upper ends of the members 103 is a ring member 106 which provides rigidity for the members 103.

The dispensing means 6 further includes means to help induce or urge downward movement of containers 2 through the pairs of jaw members 71 and 71'. In the illustrated structure these means includes a pair of jets 108 which are shown as extending through respective brackets 78 and are positioned between the pairs of jaws 71 and 71' on opposite sides thereof. The jets 108 are connected via conduits 109 to a source of pressurized fluid such as air and can either dispense air continually or intermittently, depending upon the type of control mechanism connected thereto but in the interest of economy, the preferred embodiment would have the air injected intermittently and be controlled by a cam actuated valve (not shown) operably associated with the drive means 19. In operation, the top of the lower disposed container 2 which is ready for dispensing is between the pairs of jaws 71' whereby the jets are directed generally toward the upper edge for entry into the lower container 2.

The air injected through the jets 108 help relieve any vacuum which might be induced in the lower disposed container 2, which is being dispensed into a receptacle 10, as same moves from the stack of containers 2 in the magazine 102. Also, a slight positive pressure will be induced by injecting air into the lower disposed container 2 and thereby help induce downward movement of same into a receptable 10.

Figure 5:
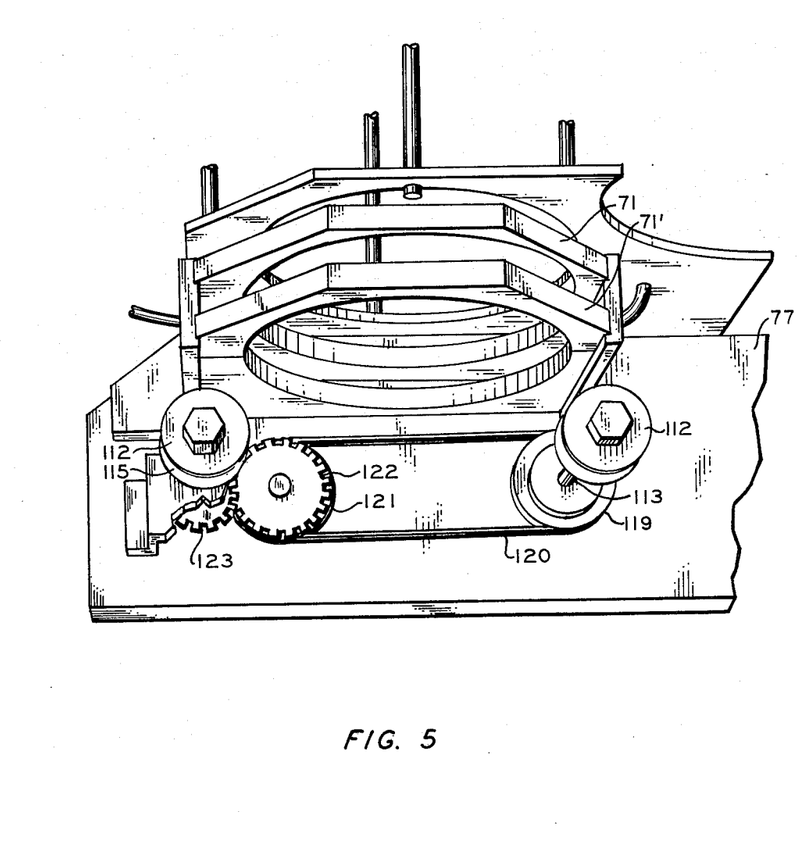
FIG. 5 is a fragmentary perspective view of a portion of the feed means.

The dispensing means 6 can also include, and as illustrated in the preferred embodiment, means for engagement with the lower disposed container 2 with the means being positioned below the jaws 71 and is operable by frictional engagement with the container 2 to be dispensed, helps induce downward or dispensing movement of same. The means is best seen in FIGS. 2 and 5 and, as shown, includes a pair of rotatable friction members 112 which are preferably resilient and one rotatably carried by the plate 77, as for example, the friction members 112 are rollers and are mounted on respective shafts 113 and 114 which are rotatably carried by the plate 77 in any suitable manner. The friction members in the illustrated structure are generally round and preferably have a peripheral or circumferential groove therearound wherein the groove 115 will provide two points of contact with the container 2 and help align the container during downward movement. The friction members 112 are positioned on opposite sides of the container 2 and below the lower disposed pair of jaws 71 and are positioned for engagement with the side wall of the container 2 preferably so that minimal force be applied to the side wall of the container 2. Drive means is provided for the friction members 112 to effect rotation thereof and, as shown, a motor 116 is mounted on the plate 104. Preferably, the friction members are driven intermittently and to accomplish this, a clutch 125 is operably connected to the motor 116 as by a chain and sprocket arrangement 124. Preferably, the clutch can be sequentially activated, as for example, by a solenoid 126 which is operated in response to operation of the micro switch 98. Such an arrangement allows continual operation of the motor 116 and sequential rotation of the friction members 112. The clutch 125, as shown, is mounted on a plate 117 which is a portion of the housing 16 and has a shaft 118 connected thereto which extends through an opening in the plate 77 and is connected to a drive pulley 119. The shaft 118 can also be the shaft 113 or can be separate therefrom and secured thereto as by mutual connection in the pulley 119. A flexible drive member such as a belt 120 is in engagement with the pulley 119 and a idler pulley 121 which is suitably rotatably mounted on the plate 77 and is in driven engagement with the belt 120. The pulley 121 is in driving engagement with the shaft 114 as, for example, by having meshed gears 122 and 123. Such an arrangement will effect counterclockwise rotation of the friction member 112 on the shaft 113 and clockwise rotation of the friction member 112 on the shaft 114. Such opposite rotation will effect downward movement of the container 2 from the jaws 71.

The seating means 9 is provided to assure proper seating of the containers within the receptacles 10 after same are dispensed by the dispensing means 6. In the illustrated structure, the seating means includes an extendable ram 127 which is mounted on a brace 128 in a suitable manner wherein, as shown, the brace is secured between the plate 77 and 117. The ram is connected to a suitable source of pressurized fluid via conduits 129 and 130 to effect the extension and retraction of the ram 127. A plate 131 is secured to the moving rod portion of the ram 127 and is movable thereby whereby extension of the ram effects movement of the plate 131 into engagement with the top of a container 2 in a receptacle 10 thereby urging same downwardly into the receptacle to assure seating within the receptacle. The ram 127 is actuated in response to a cam operated valve (not shown) operably associated with the drive means 19 to assure proper timing sequence of the operation thereof.

The bead-forming means 7 includes a forming head 134 which is secured to a shaft 135 which is suitably rotatably mounted within the housing 16. The shaft 135 is in driving engagement with a motor 136 as, for example, by a drive belt 137. The motor 136 is suitably mounted on the frame 3. Forming heads are known in the art but the forming head 134 is a preferred form and, as shown, the forming head includes a circumferential groove 139 which is sized and shaped to correspond to the type of bead to be formed and to correspond to the groove 30. Preferably, a flange 140 is sized and shaped to extend slightly into the ring 24 to entrap a portion of the side wall of the container 2 between same and a portion of the ring 24. A plurality of rollers 141 are rotatably mounted on the forming head 134 and are adapted to engage the surface 29 outside of the groove 30. This prevents rubbing frictional engagement between the forming head 134 and the ring 24. The forming head 134 is moveable axially up and down, into and out of forming engagement with a container 2 and the ring 24. Any suitable means can be provided to effect this axial movement, as is known in the art, and in the illustrated structure, an upper end of the shaft 135 has a pivotal mounting member 142 secured thereto which is in pivotal engagement with an arm 143. One end of the arm 143 is pivotally mounted on a support post 145 which in turn is secured to and extends upwardly from a portion of a housing 16. The opposite end of the arm 143 has pivotally mounted thereon an elongate link 146 which extends downwardly through the housing 16 and is operably connected to a portion of the drive means 19 whereby during sequential movement of the turret 18, the link 146 is suitably connected to the drive means to effect downward and upward movement of the forming head 135. This can be accomplished by the link 146 being connected to a rotatable wheel 147 driven by the drive means 19 to effect reciprocal up and down movement of the link 146 and thereby the shaft 135 and forming head 134. The micro switch 98 described above is preferably secured to support post 145 so that the switch activating member is selectively engageable with a portion of the arm 143 whereby pivoting movement of the arm in response to reciprocal movement of the link 146. This type of mechanism is known in the art and need not be further described herein. To form the bead on the upper edge of the container 2, a receptable in indexed under the forming head 134 with the ring 24 being in an extended or up position. After indexing of the receptacle 10 to a position under the forming head 134, the forming head 134 is rotating and the link 146 effects downward movement of the forming head 134 moving same into engagement with the upper edge of the container 2. The bead 144 is first partially formed as best seen in FIG. 7 and further downward movement of the forming head 134 after same engages the ring 24 causes further crimping and folding of the bead to substantially conform to the shape of the grooves 139 and 30 to form a uniform and quality bead. The forming head 134 moves downwardly until the ring 24 is adjacent to or engages the upper edge of the receptacle 10 wherein the latching means 32 will retain the ring 24 in its retracted position. The formed bead 144 is best seen in FIG. 8 and is completed when the ring 24 is in its retracted position and maintained in the retracted position by the latch means 32 as described above. After forming, the head 134 is retracted or moved upwardly and away from the ring 24 with the containers still being retained within the receptacle 10. After forming the receptacle and container are moved to the ejection means 8 for ejection of the container 2 from the receptacle 10.

In the form shown, the ejection means includes the above-mentioned passages 66, 67, 69 and the grooves 68 wherein pressurized fluid is introduced thereinto to eject the container 2 from the receptacle 10. For ejection, the gripping means which include the jaws 46 are released so as to permit the container 2 to be ejected from the receptacle 10. Release of the jaws 46 is effected by pivoting movement of the arm 55 which is controlled by the contour of the cam 57. Release of the gripping means preferably is accomplished between the bead-forming station and the ejection station. Pressurized fluid is supplied to the passage 67, preferably by having a discharge member 148, which is mounted adjacent to the edge of the turret 18, which has therein an opening (not shown) which will sequentially align with a passage 67 when the respective receptacle 10 is at the ejection station. The discharge member 148 is mounted on the apparatus 1 as, for example, by a bracket 149. The discharge member 148 is connected to a suitable source of pressurized fluid as by a conduit 150 and preferably there is connected in the conduit 150 a valve 151 which is operable to effect intermittent supplying of pressurized fluid to the discharge member 148. Preferably, the valve 151 is mounted on the base 12 and can be actuated as, for example by an eccentric cam 152 which can be operably connected to the drive means 19 to effect proper sequential operation of the valve 151. In operation, as the turret indexes so that a passage 67 is in alignment with the outlet of the discharge member 148, air is supplied into passage 67 and out into the receptacle 10 to blow the container out of the receptacle 10 and through a guide 154 into a discharge chute (not shown) to be conveyed to other equipment for further processing or use. Preferably the guide 154 is secured to the housing 16 in any suitable manner.

In operation, the dispensing means 6 dispenses a container 2 into a receptacle 10 wherein the ring 24 is preferably in its down or retracted position. The next indexing movement of the turret 18 moves the container 2 and its receptacle 10 to a position adjacent the seating means 9 which is operable to seat the container 2 in the receptacle 10 as described above. Further indexing movements of the turret 18 will move the container in its respective receptacle to the bead-forming means for forming of the beads 144 as described above. Between the seating means 9 and the bead-forming means 7 the gripping means are actuated as described above to firmly grip the container and retain same within the receptacle. Before reaching the bead-forming means, the ring 24 is released by actuation of the latch means 32 so that the ring 24 is in its extended or up position for proper operation of the bead-forming means 7. After the bead is formed, the container 2 and its respective receptacle 10 are then moved to the ejection station for ejection as described above.

It is to be understood that while I have illustrated and described certain forms of my invention, it is not to be limited to the specific form of arrangement of parts herein described and shown.

I claim:

1. An apparatus for rolling a top bead on a container having a side wall and bottom wall, said apparatus including:
   a support structure;
   a turret rotatably mounted on said support structure;
   first means operably connected to said turret and being operable for rotating said turret;
   a plurality of container receiving receptables mounted on said turret, said receptacles each having an open end;
   dispensing means mounted on said support structure and operable for selectively dispensing a container into a receptacle;
   a plurality of rings each movably mounted on a respective said receptacle and positioned adjacent the open end thereof, said rings each being movable between first and second positions;
   latch means carried by said turret;
   a plurality of members each extending between said latch means and a respective said ring and operable to effect cooperation between the latch means and said rings for selectively retaining the rings in a first position;
   second means cooperating with said latch means operable for selectively actuating said latch means; and
   a bead-forming head means carried by said support structure and being movable linearly and rotationally and being operable for forming a bead on a free edge of a container.

2. An apparatus as set forth in claim 1 wherein:
   said receptacles extend from one side of said turret and are generally normal thereto; and
   said first means includes an indexer operable for effecting sequential rotation of said turret.

3. An apparatus as set forth in claim 2 including:
   gripper means in each of said receptacles and movable between an expanded position and a retracted position for selectively retaining a container from movement within a receptacle; and
   third means cooperating with said gripper means operable for effecting movement of said gripper means between the expanded and retracted positions.

4. An apparatus as set forth in claim 2 wherein said latch means includes:
   a plurality of arms pivotally mounted on said turret each positioned adjacent a respective said receptacle; and
   a shoulder forming portion on each of said members positioned adjacent a respective said arm, each said shoulder forming portion being selectively engageable with a portion of a respective said arm for selectively retaining said ring in a selected position.

5. An apparatus as set forth in claim 4 wherein:
   a plurality of said members as slidably carried by a respective said receptacle each said member having a shoulder forming portion thereon;
   said arms each have a plurality of end portions with each said end portion being adjacent a respective said shoulder forming portion and adapted for selective engagement therewith;
   said second means includes a second member having a portion thereof adapted for engaging a portion of each of said arms to effect pivotal movement of said arms for selectively moving said arms out of latching engagement with the respective said shoulder forming portions;
   said head is selective engageable with each of said rings and operable for effecting movement of the respective ring from a second position to the first position; and including
   resilient means cooperating with each of said rings normally urging said rings to move from the first position to the second position.

6. An apparatus as set forth in claim 2 including:
   seating means mounted on said support structure and having a portion adapted for engaging a container positioned in a receptacle with said portion being movable for urging a container to seat in the receptacle.

7. An apparatus as set forth in claim 2 including:
a plurality of passages each communicating with the interior of a respective receptacle; and
fourth means connecting said passages to a source of pressurized fluid with introduction of fluid into a passage and a respective receptacle being operable for ejecting a container from said receptacle.

8. An apparatus as set forth in claim 7 wherein said fourth means includes:
a discharge member mounted on said support structure and positioned adjacent the turret, said discharge member having an outlet connected to said source; and wherein
each said passage has an open end selectively alignable with said outlet during movement of said turret whereby pressurized fluid discharged from said outlet is discharged into the passage aligned with said outlet.

9. An apparatus as set forth in claim 8 including:
a valve connected to said fourth means between said outlet and said source; and
fifth means operably associated with said valve and operable for selectively opening and closing said valve.

10. An apparatus as set forth in claim 2 wherein said dispensing means includes:
a plurality of pairs of jaws movably carried by said support means with said pairs of jaws each forming a container receiving opening and being spaced apart with one pair of jaws being positioned above another pair of jaws, the jaws in each pair being relatively movable between an open position and a closed position and the jaws of one pair of jaws being movable independently of the jaws of another pair of jaws;
first means positioned adjacent to and above said jaws and adapted for storing a plurality of containers;
second means operably associated with said jaws operable for effecting the movement thereof; and
third means positioned below said jaws and having a portion thereof adapted for engagement with a side wall between a top edge and bottom edge of a said container for selectively urging downward movement of a said container.

11. An apparatus as set forth in claim 10 wherein said third means includes:
a plurality of friction members movably mounted on said support and positioned for engagement with a side wall portion of said container; and
power means operably associated with said friction members operable for effecting movement thereof.

12. An apparatus as set forth in claim 11 including:
a jet positioned between adjacent said pairs of jaws and directed generally toward a said opening, said jet being operably connected to a source of pressurized gas for discharge of gas from the jet.

* * * * *